United States Patent
Bie et al.

(10) Patent No.: US 9,507,146 B2
(45) Date of Patent: Nov. 29, 2016

(54) APPARATUS FOR CLEANING OPTICAL FIBER CONNECTOR

(71) Applicant: Huawei Technologies Co., Ltd., Shenzhen (CN)

(72) Inventors: Hui Bie, Shenzhen (CN); Yali Guo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/973,170

(22) Filed: Dec. 17, 2015

(65) Prior Publication Data
US 2016/0103317 A1    Apr. 14, 2016

Related U.S. Application Data

(63) Continuation of application No. PCT/CN2015/070463, filed on Jan. 9, 2015.

(30) Foreign Application Priority Data

Aug. 13, 2014    (CN) .......................... 2014 1 0395999

(51) Int. Cl.
| | |
|---|---|
| *G02B 6/38* | (2006.01) |
| *G02B 27/00* | (2006.01) |
| *B08B 1/04* | (2006.01) |
| *G02B 6/44* | (2006.01) |
| *B08B 1/00* | (2006.01) |

(52) U.S. Cl.
CPC ............. *G02B 27/0006* (2013.01); *B08B 1/00* (2013.01); *B08B 1/008* (2013.01); *B08B 1/04* (2013.01); *G02B 6/3866* (2013.01); *G02B 6/4439* (2013.01); *B08B 2240/02* (2013.01)

(58) Field of Classification Search
CPC ............ B08B 2240/02; G02B 6/3866; G02B 27/0006
See application file for complete search history.

(56) References Cited

U.S. PATENT DOCUMENTS

| | | | |
|---|---|---|---|
| 5,220,703 | A | 6/1993 | Kanayama et al. |
| 6,209,162 | B1 | 4/2001 | Clairadin et al. |
| 6,466,723 | B2 * | 10/2002 | Miyake ................... B08B 1/008 15/231 |
| 8,943,641 | B2 * | 2/2015 | Mahapatra .............. B08B 1/003 15/104.001 |
| 2006/0191091 | A1 * | 8/2006 | Kida ......................... B08B 1/00 15/210.1 |
| 2013/0185883 | A1 | 7/2013 | Murakami et al. |
| 2014/0259480 | A1 | 9/2014 | Kida |
| 2016/0041345 | A1 | 2/2016 | Kamouchi et al. |

FOREIGN PATENT DOCUMENTS

| | | |
|---|---|---|
| CN | 2636258 Y | 8/2004 |
| CN | 1966164 A | 5/2007 |
| EP | 1300709 A1 | 4/2003 |

(Continued)

*Primary Examiner* — Randall Chin
(74) *Attorney, Agent, or Firm* — Slater Matsil, LLP

(57) ABSTRACT

The present invention provides an apparatus for cleaning an optical fiber connector, which includes a case, a tape collecting gear, a tape releasing gear, an operating portion, and a cleaning socket disposed on the case. The tape collecting gear and the tape releasing gear are rotatably accommodated in the case in sequence. The cleaning socket is located at a position between the tape collecting gear and the tape releasing gear. The operating portion includes a push rod, and an elastomer, a stop block, a sliding plate, and a toggling member that are installed in the case. In the case, one end of the sliding plate is connected to the push rod in the case and the other end shields the cleaning socket, the elastomer abuts between the stop block and the push rod.

10 Claims, 3 Drawing Sheets

(56) References Cited

FOREIGN PATENT DOCUMENTS

| | | | |
|---|---|---|---|
| GB | 2359737 A | 9/2001 |
| JP | 2001129505 A | 5/2001 |
| JP | 2013140221 A | 7/2013 |
| WO | 9723792 A1 | 7/1997 |
| WO | 2014141405 A1 | 9/2014 |

* cited by examiner ial application No. PCT/CN2015/070463, filed on Jan. 9, 2015, which claims priority to Chinese Patent Application No. 201410395999.4, filed on Aug. 13, 2014, both of which are hereby incorporated by reference in their entireties.

TECHNICAL FIELD

The present invention relates to an apparatus for cleaning an optical fiber connector.

BACKGROUND

Currently, optical fibers are connected by using an optical fiber connector, namely, an optical fiber connector or an interface. However, cleanness of the optical fiber connector directly affects an optical signal loss at a joint. A conventional manner of cleaning an optical fiber connector is using a cleaning pen or a cleaning box; however, this manner is wiping the optical fiber connector by moving the connector or a cleaning tool repeatedly after manual alignment, which increases a cleaning difficulty and decreases cleaning efficiency.

SUMMARY

Embodiments of the present invention provide an apparatus for cleaning an optical fiber connector that has a simple structure and that is convenient to carry and use.

According to a first aspect, an apparatus for cleaning an optical fiber connector is provided, and configured to clean an optical fiber connector, where the apparatus for cleaning an optical fiber connector includes a case, a tape collecting gear, a tape releasing gear, an operating portion, and a cleaning socket disposed on the case; a cleaning tape is installed between the tape collecting gear and the tape releasing gear, and the tape collecting gear and the tape releasing gear are rotatably accommodated in the case in sequence; the cleaning socket is located at a position between the tape collecting gear and the tape releasing gear and faces the cleaning tape between the tape collecting gear and the tape releasing gear; the operating portion includes a push rod, and an elastomer, a stop block, a sliding plate, and a toggling member that are installed in the case; the push rod extends into the case from the outside of the case; and in the case, one end of the sliding plate is connected to the push rod and the other end shields the cleaning socket, the elastomer abuts between the stop block and the push rod, the toggling member is disposed at one side of the sliding plate and disposed opposite to gear teeth of the tape collecting gear, the cleaning tape and the cleaning socket are located at two opposite sides of the sliding plate, the sliding plate is pushed by the push rod to slide in the case, and after the cleaning socket is exposed, the sliding plate continues to be pushed to enable the toggling member to push against the gear teeth of the tape collecting gear, and the tape collecting gear drives the cleaning tape to move.

In a first possible implementation manner, one end, away from the push rod, of the sliding plate is provided with a barrier chip and a notch, the barrier chip is disposed adjacent to the notch, and the sliding plate slides to enable the barrier chip to shield the cleaning socket or expose the cleaning socket by using the notch.

With reference to the first possible implementation manner, in a second possible implementation manner, the toggling member is provided with an extending sheet connected to the sliding plate, and an abutting arm bent from the extending sheet and extending in a manner of being parallel to the sliding plate, and the abutting arm abuts against the gear teeth of the tape collecting gear.

With reference to the second possible implementation manner, in a third possible implementation manner, the case includes a bottom wall and a side wall disposed on the bottom wall, the stop block is disposed on the bottom wall and a gap is provided between the stop block and the side wall, a groove communicated with the gap is disposed, towards the bottom wall, on the stop block, and the sliding plate is installed in the gap and can drive the toggling member to pass through the groove.

With reference to the third possible implementation manner, in a fourth possible implementation manner, the cleaning socket is disposed on the side wall, a stop frame opposite to the cleaning socket is disposed on the bottom wall, and the barrier chip is between the side wall and the stop frame and shields the cleaning socket.

With reference to the third possible implementation manner, in a fifth possible implementation manner, the push rod slides in a direction parallel to a sliding direction of the sliding plate to pass through the case and connect to an end, away from the barrier chip, of the sliding plate, and the elastomer abuts between the stop block and an end, connected to the sliding plate, of the push rod.

With reference to the fourth possible implementation manner, in a sixth possible implementation manner, the apparatus for cleaning an optical fiber connector further includes two steering pulleys, which are separately disposed on the bottom wall and located at two sides of the stop frame, and the cleaning tape is tightened by the two steering pulleys and passes between the stop frame and the barrier chip.

With reference to the fourth possible implementation manner, in a seventh possible implementation manner, a guide boss is further disposed at a joint of the bottom wall and the side wall, and a side edge of the sliding plate abuts against the guide boss and slides along the guide boss.

With reference to the first aspect or any one of the first to the seventh possible implementation manners of the first aspect, in an eighth possible implementation manner, stop elastic pieces are separately disposed, with respect to the tape collecting gear and the tape releasing gear, on the bottom wall.

With reference to the first aspect or any one of the first to the eighth possible implementation manners of the first aspect, in a ninth possible implementation manner, the apparatus for cleaning an optical fiber connector further includes a cover, where the cover covers the case to seal the case.

The apparatus for cleaning an optical fiber connector in the present invention has a simple structure and a relatively small volume, the cleaning socket can be opened and the cleaning tape can be driven to move only by pushing the push rod, so that an objective of automatic wiping and cleaning is achieved, which is relatively convenient to operate.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
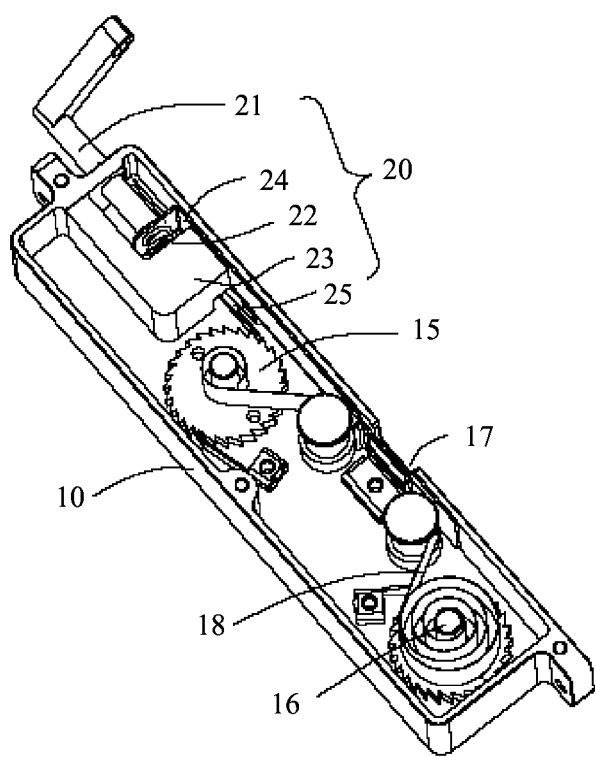
FIG. 1 is a schematic structural diagram of an apparatus for cleaning an optical fiber connector according to an exemplary embodiment of the present invention, where a cleaning socket is in an open state.

Referring to FIG. 1, an exemplary implementation manner of the present invention provides an apparatus for cleaning an optical fiber connector, configured to clean an optical fiber connector. The apparatus for cleaning an optical fiber connector includes a case 10, a tape collecting gear 15, a tape releasing gear 16, an operating portion 20, and a cleaning socket 17 disposed on the case 10. A cleaning tape 18 is installed between the tape collecting gear 15 and the tape releasing gear 16, and the tape collecting gear 15 and the tape releasing gear 16 are rotatably accommodated in the case 10 in sequence. The cleaning socket 17 is located at a position between the tape collecting gear 15 and the tape releasing gear 16 and faces the cleaning tape 18 between the tape collecting gear 15 and the tape releasing gear 16. The operating portion 20 includes a push rod 21, and an elastomer 22, a stop block 23, a sliding plate 24, and a toggling member 25 that are installed in the case 10. The push rod 21 extends into the case 10 from the outside of the case 10. In the case 10, one end of the sliding plate 24 is connected to the push rod 21 and the other end shields the cleaning socket 17, the elastomer 22 abuts between the stop block 23 and the push rod 21, the toggling member 25 is disposed at one side of the sliding plate 24 and disposed opposite to gear teeth of the tape collecting gear 15, the cleaning tape 18 and the cleaning socket 17 are located at two opposite sides of the sliding plate 24, the sliding plate 24 is pushed by the push rod 21 to slide in the case 10, and after the cleaning socket 17 exposes the cleaning tape 18, the sliding plate 24 continues to be pushed to enable the toggling member 25 to push against the gear teeth of the tape collecting gear 15, and the tape collecting gear 15 drives the cleaning tape 18 to move.

Figure 2:
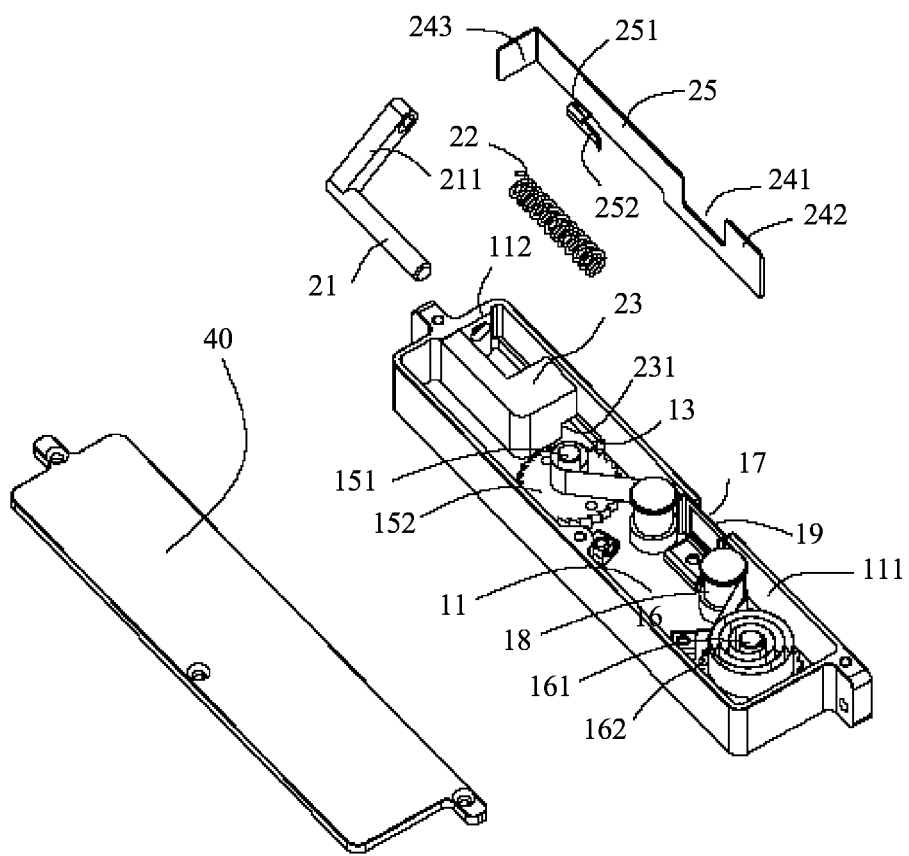
FIG. 2 is a schematic exploded view of the apparatus for cleaning an optical fiber connector according to the present invention shown in FIG. 1.

Referring to FIG. 2, in this embodiment, the case 10 has a shape of a strip-shaped groove, and includes a bottom wall 11, side walls 111 disposed on the bottom wall 11, and end walls 112 connected to the side walls 111. The apparatus for cleaning an optical fiber connector further includes a cover 40. The cover 40 covers the case 10 and is locked by using a screw or the like, so as to seal the case 10. The tape collecting gear 15 and the tape releasing gear 16 are disposed at a spacing on the bottom wall 11. The tape collecting gear 15 includes a reel 151 rotatably installed on the bottom wall 11 and a ratchet wheel 152 sleeved on the bottom of the reel 151. The tape collecting gear 15 is disposed near the stop block 23. The tape releasing gear 16 includes a reel 161 rotatably installed on the bottom wall 11 and a ratchet wheel 162 sleeved on the bottom of the reel 161. The toggling member 25 pushes against gear teeth of the ratchet wheel 152 on the tape collecting gear 15.

The push rod 21 is a round rod and one end located outside the case 10 is a grasping end 211. The push rod 21 slides to pass through an end wall 112 and is opposite to the stop block 23. The elastomer 22 is a spring. The sliding plate 24 is of a laminated structure, is parallel to a side wall 111, and slides along the side wall 111, so as to shield or expose the cleaning socket 17.

Figure 3:
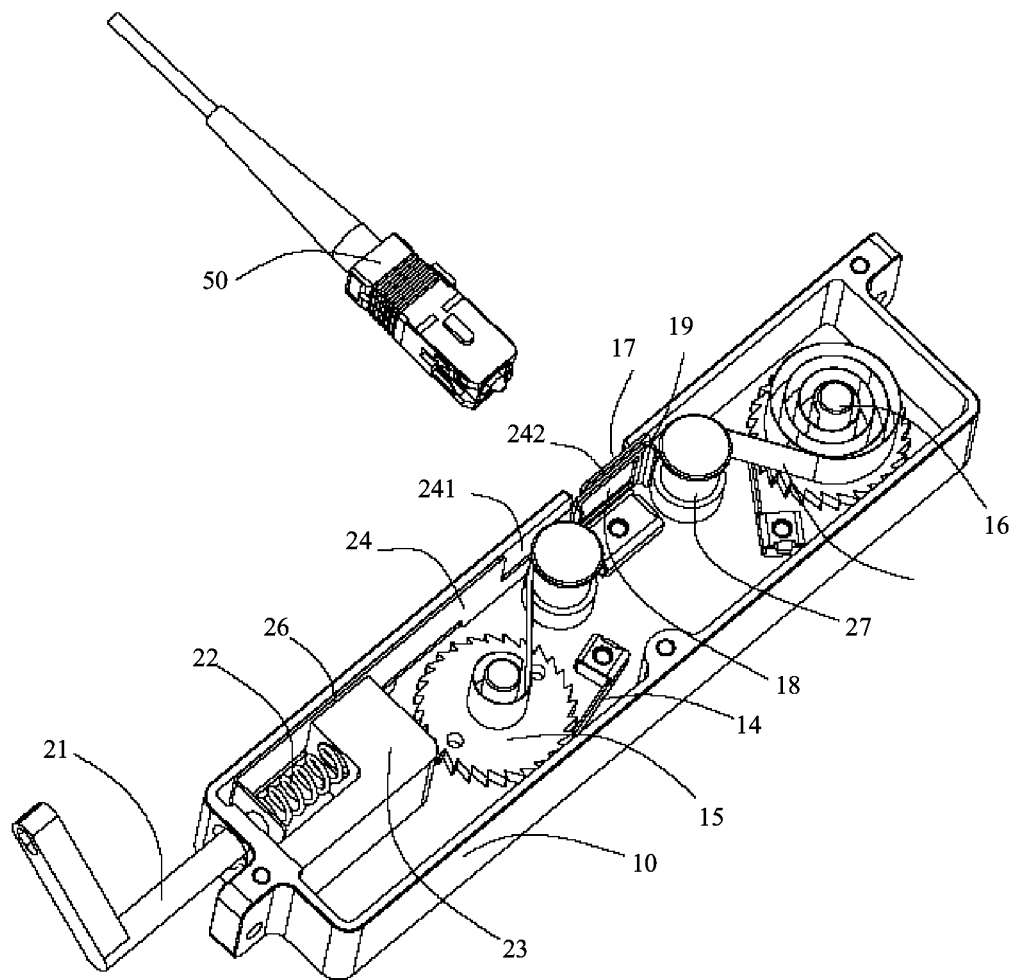
FIG. 3 is a schematic structural diagram of the apparatus for cleaning an optical fiber connector shown in FIG. 1, where the cleaning socket is in a closed state.

Referring to FIG. 3, when the apparatus for cleaning an optical fiber connector in the present invention is in a non-use state, the sliding plate 24 shields the cleaning socket 17, and the elastomer is in a compression state. During cleaning of the optical fiber connector 50, the push rod 21 is pushed into the case 10, and the push rod 21 is moved towards the stop block 23 to compress the elastomer 22 and drive the sliding plate 24 to slide along the side wall 111. The sliding plate 24 exposes the cleaning socket 17. The optical fiber connector 50 is inserted into the cleaning socket 17 and the optical fiber connector 50 is in contact with the cleaning tape 18. The sliding plate 24 continues to be pushed to: drive the toggling member 25 to move towards the tape collecting gear 15, and push against the gear teeth of the tape collecting gear 15. After the tape collecting gear 15 rotates, the cleaning tape 18 is pulled to move, and the tape releasing gear 16 also rotates to release the clean cleaning tape 18. In a process in which the cleaning tape 18 moves with rotation of the rotating tape collecting gear 15, an operation of cleaning the optical fiber connector 50 is completed. The optical fiber connector 50 is removed to remove external force to the push rod 21, and rebound force of the elastomer 22 enables the sliding plate 24, the toggling member 25, and the push rod 21 to return to their initial positions, and the cleaning socket 17 is shielded by the sliding plate 24 again. The apparatus for cleaning an optical fiber connector in the present invention has a simple structure and a relatively small volume, the cleaning socket 17 can be opened and an objective of automatic wiping and cleaning can be achieved by only pushing the push rod 21, which is relatively convenient to operate.

Further, one end, away from the push rod 21, of the sliding plate 24 is provided with a barrier chip 241 and a notch 242. The barrier chip 241 is disposed adjacent to the notch 242, and the sliding plate 24 slides to enable the barrier chip 241 to shield the cleaning socket 17 or expose the cleaning socket 17 by using the notch 242.

In this embodiment, the sliding plate 24 is an elongated sheet body. An end, connected to the push rod 21, of the sliding plate 24 is a bending end 243. The barrier chip 241 and the notch 242 are disposed at one side of an end away from the bending end 243, and the notch 242 is located at a position between the barrier chip 241 and the bending end 243. The barrier chip 241 shields the cleaning socket 17 to seal the cleaning socket 17. When the sliding plate 24 is pushed by the push rod 21 to slide, the barrier chip 241 slides with the sliding plate 24 and leaves the cleaning socket 17, and then the notch 242 is opposite to and communicated with the cleaning socket 17, that is, the cleaning socket 17 is exposed.

Further, the toggling member 25 is provided with an extending sheet 251 connected to the sliding plate 24 and an abutting arm 252 bent from the extending sheet 251 and extending in a manner of being parallel to the sliding plate 24, and the abutting arm 252 abuts against the gear teeth of the tape collecting gear 15. Still further, the push rod 21 slides in a direction parallel to a sliding direction of the sliding plate 24 to pass through the case 10 and connect to an end, away from the barrier chip 241, of the sliding plate 24, and the elastomer 22 abuts between the stop block 23 and an end, connected to the sliding plate 24, of the push rod 21. In this embodiment, the extending sheet 251 is protruded from an edge of a surface of the sliding plate 24 and close to the bending end 243. After the extending sheet 251 is bent from an end, the extending sheet 251 extends in a manner of being parallel to the sliding plate 24 and towards the barrier chip 241 to form the abutting arm 252. The push rod 21 is connected to the bending end 243.

Further, the stop block 23 is disposed on the bottom wall 11 and a gap 26 is provided between the stop block 23 and the side wall 111. A groove 231 communicated with the gap 26 is disposed, towards the bottom wall, on the stop block 23. The sliding plate 24 is installed in the gap 26 and can drive the toggling member 25 to pass through the groove 231. In this embodiment, the gap 26 provides sliding space for the sliding plate 24 and prevents the sliding plate 24 from deviating from a sliding track.

Further, a guide boss 13 is further disposed at a joint of the bottom wall 11 and the side wall 111, and a side edge of the sliding plate 24 abuts against the guide boss 13 and slides along the guide boss 13. In this embodiment, the guide boss 13 enables the sliding plate 24 to be away from the bottom wall 11, so as to avoid the extending sheet 251 and the abutting arm 252 from being in contact with the bottom wall 11 during sliding.

Further, the cleaning socket 17 is disposed on the side wall 111, a stop frame 19 opposite to the cleaning socket 17 is disposed on the bottom wall 11, and the barrier chip 241 is disposed between the side wall 111 and the stop frame 19 and shields the cleaning socket 17. In this embodiment, the stop frame 19 is a rectangular frame whose size is equivalent to that of the cleaning socket 17, and the stop frame 19 is parallel to the side wall 111 and faces the cleaning socket 17. The stop frame 19 prevents the cleaning tape 18 from being away from the cleaning socket 17.

Further, the apparatus for cleaning an optical fiber connector further includes two steering pulleys 27, which are separately disposed on the bottom wall 11 and located at two sides of the stop frame 19, and the cleaning tape 18 is tightened by the two steering pulleys 27 and passes between the stop frame 19 and the barrier chip 241. In this embodiment, the two steering pulleys 27 are located at positions between the tape collecting gear 15 and the tape releasing gear 16 and are next to the side wall 111. The cleaning tape extends out of the tape releasing gear 16 and is wound around the two steering pulleys 27 and then is wound on the tape collecting gear 15, and the cleaning tape between the two steering pulleys 27 is sleeved on one side of the stop frame 19 and is opposite to the cleaning socket 17, and the cleaning tape is tightened to be in better contact with the optical fiber connector 50.

Further, stop elastic pieces 14 are separately disposed, with respect to the tape collecting gear 15 and the tape releasing gear 16, on the bottom wall 11. The stop elastic pieces 14 elastically abut against the gear teeth of the tape collecting gear 15 and the gear teeth of the tape releasing gear 16, so as to limit rotating speeds of the tape collecting gear 15 and the tape releasing gear 16 and locate the tape collecting gear 15 and the tape releasing gear 16.

What is disclosed above is merely exemplary embodiments of the present invention, and certainly is not intended to limit the protection scope of the present invention. A person of ordinary skill in the art may understand that all or some of processes that implement the foregoing embodiments and equivalent modifications made according to the claims of the present invention shall fall within the scope of the present invention.

What is claimed is:
1. An apparatus, comprising:
a case;
a tape collecting gear;
a tape releasing gear, the tape collecting gear and the tape releasing gear being rotatably accommodated in the case in sequence;
a cleaning tape installed between the tape collecting gear and the tape releasing gear;
an operating portion installed in the case, the operating portion comprising:
a push rod extending into the case from the outside of the case;
an elastomer;
a stop block, the elastomer abutting between the stop block and the push rod;
a sliding plate; and
a toggling member disposed at one side of the sliding plate and disposed opposite to gear teeth of the tape collecting gear; and
a cleaning socket disposed on the case, the cleaning socket located at a position between the tape collecting gear and the tape releasing gear, and facing the cleaning tape between the tape collecting gear and the tape releasing gear, wherein one end of the sliding plate is connected to the push rod and the other end shields the cleaning socket, the cleaning tape and the cleaning socket being located at two opposite sides of the sliding plate;
wherein the sliding plate is configured to be pushed by the push rod to slide in the case and expose the cleaning socket, and after the cleaning socket is exposed, the sliding plate continues to be pushed to enable the toggling member to push against the gear teeth of the tape collecting gear, and the tape collecting gear drives the cleaning tape to move.

2. The apparatus according to claim 1, wherein one end of the sliding plate, away from the push rod, is provided with a barrier chip and a notch, the barrier chip disposed adjacent to the notch, and wherein the sliding of the sliding plate enables the barrier chip to shield the cleaning socket or expose the cleaning socket using the notch.

3. The apparatus according to claim 2, wherein the toggling member is provided with an extending sheet connected to the sliding plate and an abutting arm, the abutting arm bent from the extending sheet and extending in a manner that is parallel to the sliding plate, the abutting arm abutting against the gear teeth of the tape collecting gear.

4. The apparatus according to claim 3, wherein the case comprises a bottom wall and a side wall disposed on the bottom wall, the stop block is disposed on the bottom wall, a gap is provided between the stop block and the side wall, a groove communicated with the gap is disposed on the stop block towards the bottom wall, and the sliding plate is installed in the gap and configured to drive the toggling member to pass through the groove.

5. The apparatus according to claim 4, wherein the cleaning socket is disposed on the side wall, a stop frame opposite to the cleaning socket is disposed on the bottom wall, and the barrier chip is between the side wall and the stop frame and shields the cleaning socket.

6. The apparatus according to claim 5, wherein the apparatus further comprises two steering pulleys, separately disposed on the bottom wall and located at two sides of the stop frame, wherein the cleaning tape is tightened by the two steering pulleys and passes between the stop frame and the barrier chip.

7. The apparatus according to claim 4, wherein the push rod is configured to slide in a direction parallel to a sliding direction of the sliding plate to pass through the case and connect to an end, away from the barrier chip, of the sliding plate, and the elastomer abuts between the stop block and an end, connected to the sliding plate, of the push rod.

8. The apparatus according to claim 5, wherein a guide boss is disposed at a joint of the bottom wall and the side wall, and a side edge of the sliding plate abuts against the guide boss and is configured to slide along the guide boss.

9. The apparatus according to claim 1, wherein stop elastic pieces are separately disposed, with respect to the tape collecting gear and the tape releasing gear, on the bottom wall.

10. The apparatus according to claim 1, wherein the apparatus further comprises a cover, the cover being configured to seal the case.

* * * * *